(12) United States Patent
Iwasaki et al.

(10) Patent No.: US 9,583,777 B2
(45) Date of Patent: Feb. 28, 2017

(54) SOLID OXIDE FUEL CELL, CELL STACK DEVICE, FUEL CELL MODULE, AND FUEL CELL DEVICE

(75) Inventors: Kenichi Iwasaki, Kirishima (JP); Takayuki Iwamoto, Kirishima (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 347 days.

(21) Appl. No.: 14/241,870

(22) PCT Filed: Aug. 31, 2012

(86) PCT No.: PCT/JP2012/072199
§ 371 (c)(1),
(2), (4) Date: Feb. 27, 2014

(87) PCT Pub. No.: WO2013/031961
PCT Pub. Date: Mar. 7, 2013

(65) Prior Publication Data
US 2014/0212786 A1    Jul. 31, 2014

(30) Foreign Application Priority Data
Aug. 31, 2011    (JP) ................................ 2011-189090

(51) Int. Cl.
*H01M 8/12* (2016.01)
*H01M 8/10* (2016.01)
(Continued)

(52) U.S. Cl.
CPC ......... *H01M 8/1004* (2013.01); *H01M 8/004* (2013.01); *H01M 8/1246* (2013.01);
(Continued)

(58) Field of Classification Search
USPC .................................................. 429/400–535
See application file for complete search history.

(56) References Cited

U.S. PATENT DOCUMENTS 7,931,990 B2 *   4/2011   Brown ................ H01M 4/8621
                                                          429/407
2003/0148160 A1   8/2003   Song et al.
(Continued)

FOREIGN PATENT DOCUMENTS

| JP | 2008084716 | 4/2008 |
| JP | 2009259746 | 11/2009 |
| JP | 2010277745 A | 12/2010 |

OTHER PUBLICATIONS

Machine Translation of Teruhiko et al. (JP 2009-259746, published Nov. 2009, pp. 1-14).*
(Continued)

*Primary Examiner* — Jonathan Crepeau

(57) ABSTRACT

A solid oxide fuel cell, a cell stack device, a fuel cell module and a fuel cell device are disclosed. The solid oxide fuel cell includes a solid electrolyte layer, fuel electrode layer and an oxygen electrode layer. The solid electrolyte layer has gas blocking properties and includes first and second main surfaces opposite to each other. The fuel electrode layer is disposed on the first main surface while the oxygen electrode layer is disposed on the second main surface of the solid electrolyte layer. A thickness of the solid electrolyte layer is 40 μm or less. Porosity of the solid electrolyte layer in an arbitrary cross section thereof is 3 to 15% by area. An average pore diameter of pores in the solid electrolyte layer is 2 μm or less.

9 Claims, 5 Drawing Sheets

(51) Int. Cl.
*H01M 8/00* (2016.01)
*H01M 8/02* (2016.01)

(52) U.S. Cl.
CPC .. *H01M 8/0217* (2013.01); *H01M 2008/1293* (2013.01); *Y02E 60/521* (2013.01); *Y02E 60/525* (2013.01); *Y02P 70/56* (2015.11)

(56) References Cited

U.S. PATENT DOCUMENTS

| | | | |
|---|---|---|---|
| 2004/0033411 A1* | 2/2004 | Lersch | H01M 8/0204 429/434 |
| 2006/0269813 A1* | 11/2006 | Seabaugh | B01D 67/0041 429/465 |
| 2007/0082254 A1* | 4/2007 | Hiwatashi | H01M 4/9016 429/489 |
| 2007/0141443 A1 | 6/2007 | Brown | |

OTHER PUBLICATIONS

European Search Report issued in the corresponding European patent application No. 12828807.3 dated Mar. 27, 2015.
English Translation of International Search Report issued in PCT/JP2012/072199 dated Sep. 26, 2012.

* cited by examiner (a)

(b)

SOLID OXIDE FUEL CELL, CELL STACK DEVICE, FUEL CELL MODULE, AND FUEL CELL DEVICE

CROSS-REFERENCE TO RELATED APPLICATIONS

This application is a national phase of the International application PCT/JP2012/072199 filed Aug. 31, 2012 that claims priority from the Japanese patent application 2011-189090 filed Aug. 31, 2011. The contents of these aforementioned documents is herewith incorporated by reference.

FIELD OF INVENTION

The present invention relates to a solid oxide fuel cell in which a fuel electrode layer is formed on one main surface of a solid electrolyte layer and an oxidization electrode layer is formed on the other main surface, a cell stack device, a fuel cell module, and a fuel cell device.

BACKGROUND OF THE INVENTION

In recent years, various fuel cell devices storing a cell stack device obtained by electrically connecting a plurality of solid oxide fuel cells in series in a storage container have been proposed as the next-generation energy.

The solid oxide fuel cells of such a fuel cell device have a pair of flat surfaces in parallel to each other, a fuel gas passage for circulating fuel gas inside, and a conductive support member containing Ni. A solid oxide fuel cell has been proposed in which a fuel electrode layer, a solid electrolyte layer, and an oxygen electrode layer are successively laminated on the one flat surface of the conductive support member and an interconnector layer is laminated on the other flat surface (for example, Japanese Unexamined Patent Application Publication No. 2008-84716).

Heretofore, the solid oxide fuel cell has been configured so that a solid electrolyte layer containing a $ZrO_2$-based dense sintered compact formed in such a manner as to surround the circumference of a conductive support member and an interconnector layer containing a $LaCrO_3$-based dense sintered compact are joined to each other in such a manner that both ends of the solid electrolyte layer are overlapped with both ends of the solid electrolyte layer.

More specifically, it has been configured so that the circumference of the conductive support member is air-tightly surrounded by the solid electrolyte layer and the interconnector layer to prevent fuel gas which passes through the inside of the conductive support member from leaking to the outside from a dense cylindrical body formed by the solid electrolyte layer and the interconnector layer. Therefore, the relative density of the solid electrolyte layer has been set to 97% or more and a denser film has been demanded.

A fuel cell has also been developed in which a solid electrolyte layer contains a dense electrolyte layer disposed on the side of a fuel electrode layer and a porous electrolyte layer disposed on the side of an air electrode and the porosity of the dense electrolyte layer is 5% or less and the porosity of the porous electrolyte layer is 20 to 60% (for example, Japanese Unexamined Patent Application Publication No. 2009-259746).

The following is a list of the aforementioned background art:
Patent Literature 1: Japanese Unexamined Patent Application Publication No. 2008-84716
Patent Literature 2: Japanese Unexamined Patent Application Publication No. 2009-259746

SUMMARY OF INVENTION

In recent years, since the ion conductivity of the solid electrolyte layer improves as the thickness decreases and the power generation performance of the fuel cell improves, the thickness of the solid electrolyte layer tends to decrease in order to improve the power generation performance. On the other hand, in order to prevent the leakage of fuel gas, an increase in the denseness of the solid electrolyte layer has been demanded. However, when the number of pores has been reduced to increase the denseness, high stress has been sometimes generated in the solid electrolyte layer, and there has been a possibility that cracking has occurred depending on the case.

More specifically, for example, since both sides of the solid electrolyte layer have been exposed to a reduction atmosphere and an oxidation atmosphere through the fuel electrode layer and the oxygen electrode layer during power generation, there has been a possibility that high stress has been generated in the solid electrolyte layer associated with the contraction during the reduction of the fuel electrode layer and the expansion during the oxidization of the oxygen electrode layer, the layers which are formed on the surface of the thin solid electrolyte layer.

It is an object of the present invention to provide a solid oxide fuel cell in which stress generated in a solid electrolyte layer can be reduced, a cell stack device, a fuel cell module, and a fuel cell device.

SUMMARY OF THE INVENTION

In a solid oxide fuel cell of the present invention, a fuel electrode layer is arranged on one main surface of a solid electrolyte layer that has gas blocking properties, and an oxygen electrode layer is arranged on the other main surface of the solid electrolyte layer, in which the thickness of the solid electrolyte layer is 40 μm or less, the porosity in an arbitrary cross section of the solid electrolyte layer is 3 to 15% by area, and the average pore diameter of pores in the solid electrolyte layer is 2 μm or less.

A cell stack device of the present invention includes a plurality of the aforementioned solid oxide fuel cells, wherein the plurality of the solid oxide fuel cells are electrically connected.

In a fuel cell module of the present invention, a plurality of the aforementioned solid oxide fuel cells are placed in a storage container.

In a fuel cell device of the present invention, the aforementioned fuel cell module and an auxiliary device for operating the fuel cell module are placed in an outer case.

According to the solid oxide fuel cell of the present invention, due to the fact that even when the porosity in an arbitrary cross section of the solid electrolyte layer is 3 to 15% by area, the average pore diameter of the solid electrolyte layer is 2 μm or less, fuel gas to be supplied to the fuel electrode layer and oxygen containing gas to be supplied to the oxygen electrode layer can be blocked by the solid electrolyte layer even when the thickness of the solid electrolyte layer is 40 μm or less. Moreover, since the porosity in the arbitrary cross section of the solid electrolyte layer is as high as 3 to 15% by area, the rigidity of the solid electrolyte layer decreases, so that stress generated in the thin solid electrolyte layer can be reduced. Thus, a cell stack device, a fuel cell module, and a fuel cell device which are excellent in reliability over a long period of time can be provided.

BRIEF DESCRIPTION OF DRAWINGS

FIG. 1 illustrate a solid oxide fuel cell, in which FIG. 1(a) is a transverse cross section and FIG. 1(b) is a side view when FIG. 1(a) is seen from an interconnector layer.

FIG. 3 illustrate an example of a cell stack device, in which FIG. 3(a) is a side view schematically illustrating the cell stack device and FIG. 3(b) is a cross sectional view in which portions enclosed with the dashed lines of the cell stack device of FIG. 3(a) are partially enlarged.

DETAILED DESCRIPTION OF THE DRAWINGS

Figure 1:
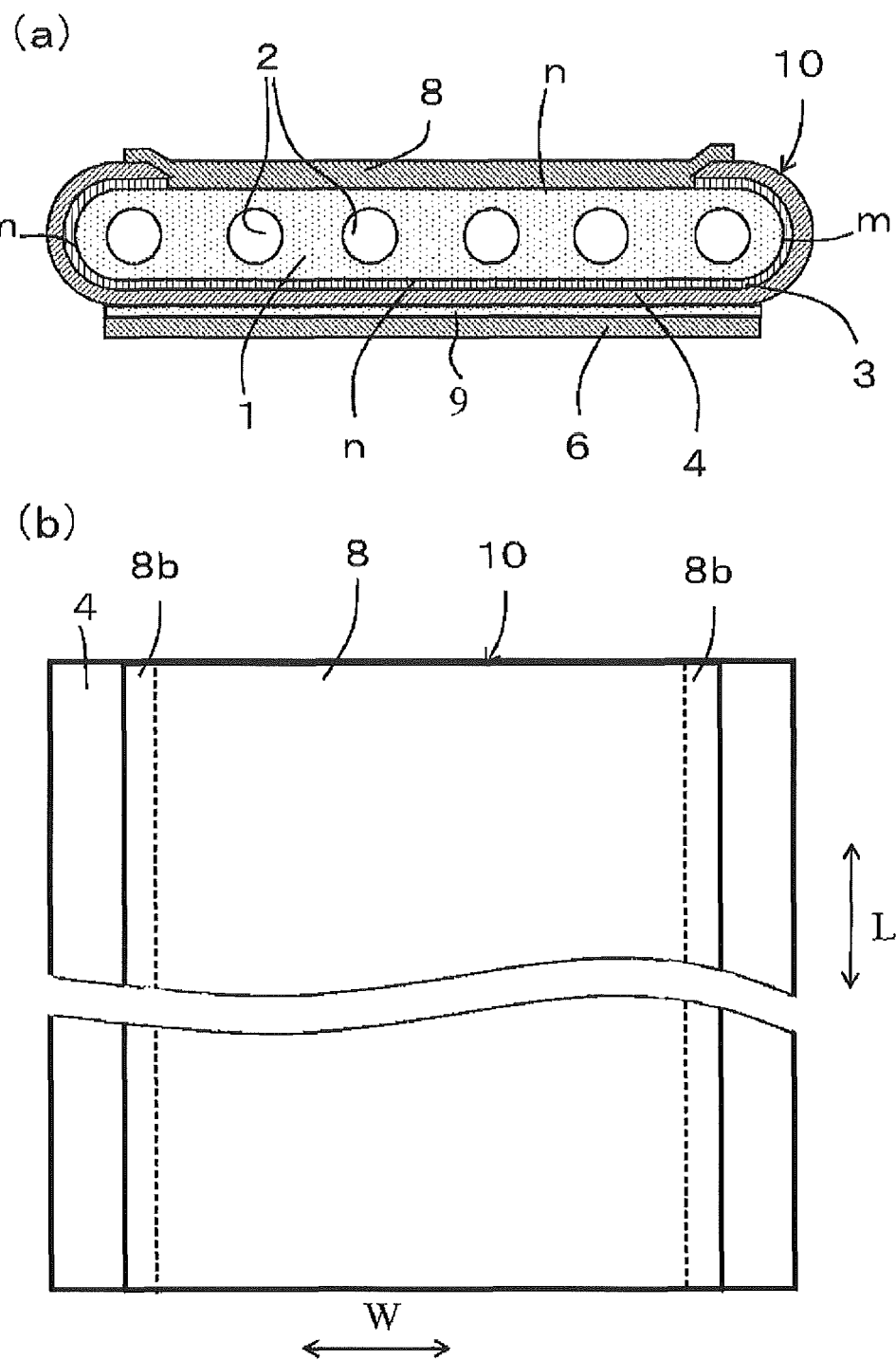

FIG. 1 illustrate an example of a solid oxide fuel cell (hereinafter abbreviated as a fuel cell) of this embodiment, in which FIG. 1(a) is a transverse cross section thereof and FIG. 1(b) is a side view of FIG. 1(a). In both the drawings, a part of each component of a fuel cell 10 is illustrated on an enlarged scale.

The fuel cell 10 is a hollow flat plate fuel cell 10, has a flat cross section, and has a porous conductive support member 1 containing Ni having an elliptic cylindrical shape on the whole. Inside the conductive support member 1, a plurality of fuel gas passages 2 are formed in such a manner as to penetrate in a length direction L with suitable intervals. The fuel cell 10 has a structure in which various kinds of members are provided on the conductive support member 1.

As understood from the shape illustrated in FIG. 1, the conductive support member 1 is constituted by a pair of flat surfaces n in parallel to each other and arc-like surfaces (side surfaces) m which each connect the pair of flat surfaces n. Both surfaces of the flat surfaces n are formed almost in parallel to each other. A porous fuel electrode layer 3 is disposed in such a manner as to cover one flat surface n (lower surface) and the arc surfaces m on both sides. Further, a solid electrolyte layer 4 having gas blocking properties is disposed in such a manner as to cover the fuel electrode layer 3. Moreover, on the surface of the solid electrolyte layer 4, a porous oxygen electrode layer 6 is disposed in such a manner as to face the fuel electrode layer 3 through an intermediate layer 9. In other words, the fuel electrode layer 3 is disposed on one main surface of the solid electrolyte layer 4 and the oxygen electrode layer 6 is disposed on the other main surface thereof.

On the other flat surface n (upper surface) where the fuel electrode layer 3 and the solid electrolyte layer 4 are not laminated, an interconnector 8 having gas blocking properties is formed through an adhesion layer which is not illustrated.

More specifically, the fuel electrode layer 3 and the solid electrolyte layer 4 are formed from one flat surface (lower surface) to the other flat surface n (upper surface) through the arc-like surfaces m on both ends and both ends of the interconnector layer 8 are laminated on and joined to both ends of the solid electrolyte layer 4.

That is, it is configured so that the conductive support member 1 is surrounded by the solid electrolyte layer 4 having gas blocking properties and the interconnector layer 8 to prevent fuel gas circulating inside from leaking to the outside. In other words, the solid electrolyte layer 4 and the interconnector layer 8 form an elliptical cylindrical body having gas blocking properties. The inside of the elliptical cylindrical body is used as a fuel gas passage, and the fuel gas to be supplied to the fuel electrode layer 3 and the oxygen containing gas to be supplied to the oxygen electrode layer 6 are blocked by the elliptical cylindrical body.

Specifically described, as illustrated in FIG. 1(b), the interconnector layer 8 having a rectangular plane shape is formed from the upper end to the lower end of the conductive support member 1 and both right and left end portions 8b thereof are joined to the surfaces of the both right and left end portions of the solid electrolyte layer 4.

Herein, the fuel cell 10 generates power when a portion where the fuel electrode layer 3 and the oxygen electrode layer 6 face each other through the solid electrolyte layer 4 functions as a fuel cell. More specifically, oxygen containing gas, such as air, is allowed to flow to the outside of the oxygen electrode layer 6 and fuel gas (hydrogen containing gas) is allowed to flow through the fuel gas passage 2 in the conductive support member 1, and then the fuel cell 10 is heated to a predetermined operating temperature to thereby generate power. Then, current generated by the power generation is collected through the interconnector layer 8 provided on the conductive support member 1.

In this embodiment, it is configured so that the solid electrolyte layer 4 has pores B, the thickness of the solid electrolyte layer 4 is 40 μm or less, the porosity in an arbitrary cross section of the solid electrolyte layer 4 is 3 to 15% by area (0.5 to 5.8% by volume), and the average pore diameter of the pores B in the solid electrolyte layer 4 is 2 μm or less. When the porosity of the solid electrolyte layer 4 is less than 3% by area, the denseness degree of the solid electrolyte layer 4 becomes high, which leads to a possibility that high stress is generated in the solid electrolyte layer 4. For example, there is a possibility that high stress is generated in the solid electrolyte layer 4 formed on the arc-like surfaces m, so that cracking occurs. When the porosity is higher than 15% by area, there is a possibility that the pores B are connected to communicate with each other, so that gas penetrates into the solid electrolyte layer 4, which reduces the gas blocking properties by the solid electrolyte layer 4. In this embodiment, only one solid electrolyte layer 4 is provided.

Figure 2:
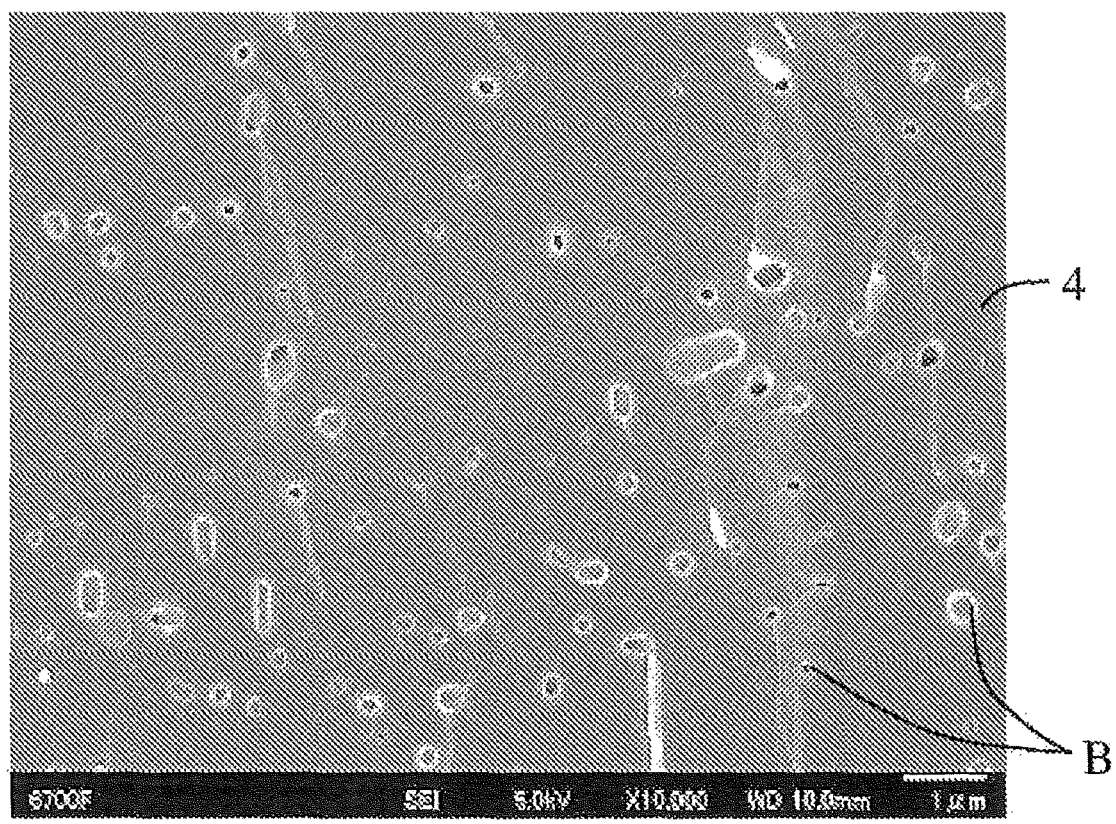
FIG. 2 is a scanning electron microscope (SEM) photograph of the cross section of the solid electrolyte layer of FIG. 1.

FIG. 2 shows an SEM photograph of the cross section in the thickness direction of the solid electrolyte layer 4. In FIG. 2, it is found that the pores B form an almost spherical shape and are present in a dispersed manner and do not communicate with each other.

A reason for setting the thickness of the solid electrolyte layer 4 to 40 μm or less resides in the fact that when the thickness is larger than 40 μm, the power generation performance of the fuel cell 10 decreases. In particular, when the thickness of the solid electrolyte layer 4 is 20 to 40 μm, the porosity is desirably 8 to 15% by area. When the thickness of the solid electrolyte layer 4 is 5 to 15 μm, the porosity is desirably 3 to 8% by area.

Moreover, a reason for setting the average pore diameter of the pores B in the solid electrolyte layer 4 to 2 μm or less resides in the fact that when the average pore diameter of the pores B is larger than 2 μm, there is a possibility that the pores B are connected to communicate with each other, so that gas penetrates into the solid electrolyte layer 4. The average pore diameter of the pores B in the solid electrolyte layer 4 is desirably 1.5 μm or less and particularly desirably 1 μm or less in terms of the fact that the number of large pores decreases and the probability that the pores are connected to each other becomes small. In particular when the thickness of the solid electrolyte layer 4 is 15 μm or less, the average pore diameter of the pores B is desirably 1 μm or less and particularly desirably 0.8 μm or less. On the other hand, the average pore diameter of the pores B is desirably 0.1 μm or more and particularly desirably 0.2 μm or more. The average pore diameter of the pores B in this solid electrolyte layer 4 is desirably 1/20 or less of the thickness of the solid electrolyte layer 4 in terms of the fact that the number of large pores decreases and the probability that the pores are connected to each other becomes small.

Heretofore, the solid electrolyte layer 4 has been demanded to have higher denseness in order to block fuel gas and oxygen containing gas. However, in such a dense solid electrolyte layer 4, the number of the pores B is small, and therefore the rigidity tends to be high. In a thin solid electrolyte layer 4 with high rigidity, there has been a possibility that high stress is generated in the solid electrolyte layer 4 due to the fuel electrode layer 3 and the conductive support member 1 present inside relative to the solid electrolyte layer 4 and the oxygen electrode layer 6 present outside relative to the solid electrolyte layer 4.

In the solid oxide fuel cell 10 of this embodiment, the thickness of the solid electrolyte layer 4 is 40 μm or less, the porosity in an arbitrary cross section of the solid electrolyte layer 4 is 3 to 15% by area, and the average pore diameter of the pores B in the solid electrolyte layer 4 is 2 μm or less. Therefore, the fuel gas to be supplied to the fuel electrode layer 3 and the oxygen containing gas to be supplied to the oxygen electrode layer 6 can be blocked by the solid electrolyte layer 4.

Moreover, since the porosity of the solid electrolyte layer 4 is as high as 3 to 15% by area, the rigidity of the solid electrolyte layer 4 decreases, so that the solid electrolyte layer 4 has flexibility while maintaining the gas blocking properties and can reduced stress generated in the solid electrolyte layer 4.

For example, in the solid electrolyte layer 4 in a portion of covering the arc-like surfaces m having a small curvature radius described above, high stress is likely to be generated due to an oxidation-reduction reaction of the fuel electrode layer 3 and the conductive support member 1. On the other hand, in this embodiment, since the thickness of the solid electrolyte layer 4 is 40 μm or less and the porosity in an arbitrary cross section is as high as 3 to 15% by area, the solid electrolyte layer 4 itself flexibly changes, so that the generation of stress in the solid electrolyte layer 4 in the portions of the arc-like surfaces m can be reduced.

In this embodiment, the residual stress of the solid electrolyte layer 4 is compression stress and the residual stress is as low as 400 MPa or less.

Hereinafter, each member constituting the fuel cell 10 of this embodiment is described.

The conductive support member 1 is required to have gas permeability in order to allow the fuel gas to penetrate into the fuel electrode layer 3 and has conductivity in order to collect current through the interconnector layer 8. Therefore, it is preferable for the conductive support member 1 to be formed with Ni and/or NiO and inorganic oxide, such as a specific rare earth oxide.

The specific rare earth oxide is one used in order to approximate the thermal expansion coefficient of the conductive support member 1 to the thermal expansion coefficient of the solid electrolyte layer 4. A rare earth oxide containing at least one element selected from the group consisting of Y, Lu, Yb, Tm, Er, Ho, Dy, Gd, Sm, and Pr can be used in combination with Ni and/or NiO. As a specific example of such a rare earth oxide, $Y_2O_3$, $Lu_2O_3$, $Yb_2O_3$, $Tm_2O_3$, $Er_2O_3$, $HO_2O_3$, $Dy_2O_3$, $Gd_2O_3$, $Sm_2O_3$, and $Pr_2O_3$ can be mentioned. $Y_2O_3$ and $Yb_2O_3$ are preferable in terms of the facts that the formation of a solid-solution and a reaction with Ni and/or NiO hardly occur, the thermal expansion coefficient is almost the same as that of the solid electrolyte layer 4, and the cost is low.

Moreover, in this embodiment, it is preferable that Ni and/or NiO and rare earth oxide are present with a volume ratio of Ni and/or NiO: Rare earth oxide=35:65 to 65:35 in terms of maintaining good conductivity of the conductive support member 1 and approximating the thermal expansion coefficient to that of the solid electrolyte layer 4. The conductive support member 1 may contain other metal components and oxide components insofar as the required properties are not impaired.

Moreover, since the conductive support member 1 is required to have fuel gas permeability, it is preferable for the conductive support member 1 to be porous and have an open porosity of usually 30% or more and particularly preferably in the range of 35 to 50%. The conductivity of the conductive support member 1 is preferably 300 S/cm or more and particularly preferably 440 S/cm or more.

The length (length in a width direction W of the conductive support member 1) of the flat surfaces n of the conductive support member 1 is 15 to 35 mm, the length of the arc-like surfaces m (length of the arc) is 2 to 8 mm, and the thickness (thickness between the flat surfaces n) of the conductive support member 1 is 1.5 to 5 mm, for example. The length of the conductive support member 1 is set to 100 to 300 mm, for example. Considering the fact, the formation area (area of the other main surface of the solid electrolyte layer 4) of the solid electrolyte layer 4 on the conductive support member 1 is set to 1900 $mm^2$ or more. In particular, the formation area is set to 5000 to 15300 $mm^2$. Thus, even when the formation area of the solid electrolyte layer 4 is large, the gas blocking properties can be held.

The fuel electrode layer 3 is one for causing an electrode reaction and the fuel electrode layer 3 itself can be formed with known porous conductive ceramics. For example, the fuel electrode layer 3 can be formed from $ZrO_2$ in which a rare earth element forms solid-solution or $CeO_2$ in which a rare earth element forms solid-solution and Ni and/or NiO. As the rare earth element, the rare earth elements mentioned in the description of the conductive support member 1 can be used. The fuel electrode layer 3 can be formed from $ZrO_2$ (YSZ) in which Y forms solid-solution and Ni and/or NiO, for example.

The content of the $ZrO_2$ in which a rare earth element forms solid-solution or the $CeO_2$ in which a rare earth element forms solid-solution in the fuel electrode layer 3 is preferably in the range of 35 to 65% by volume and the content of Ni or NiO is preferably in the range of 65 to 35% by volume. The open porosity of the fuel electrode layer 3 is preferably 15% or more and particularly preferably in the range of 20 to 40%. The thickness is preferably 1 to 30 μm.

Since the fuel electrode layer 3 may be formed at a position facing the oxygen electrode layer 6, the fuel electrode layer 3 may be formed only on the lower flat surface n of the conductive support member 1 on which the oxygen electrode layer 6 is provided, for example. More specifically, it may be structured so that the fuel electrode layer 3 is provided only on the lower flat surface n of the conductive support member 1 and the solid electrolyte layer 4 is formed on the surface of the fuel electrode layer 3, both the arc-like surfaces m of the conductive support member 1, and the upper flat surface n of the conductive support member 1 on which the fuel electrode layer 3 is not formed.

For the solid electrolyte layer 4, it is preferable to use 3 to 15% by mol of ceramics containing partially stabilized or stabilized $ZrO_2$ containing a rare earth element, such as Y, Sc, and Yb. Moreover, as the rare earth element, Y is preferably in terms of low cost. It is a matter of course that the solid electrolyte layer 4 is not limited to a solid electrolyte layer containing ceramics containing partially stabilized or stabilized $ZrO_2$ and may be a known lanthanum gallate-based solid electrolyte layer.

Between the solid electrolyte layer 4 and the oxygen electrode layer 6 described later, an intermediate layer 9 is formed in order to strengthen the junction of the solid electrolyte layer 4 and the oxygen electrode layer 6 and reduced the formation of a reaction layer with high electrical resistance due to a reaction of the components of the solid electrolyte layer 4 and the components of the oxygen electrode layer 6.

It is preferable to form the oxygen electrode layer 6 with conductive ceramics containing a so-called $ABO_3$ perovskite oxide. As the perovskite oxide, a transition metal perovskite oxide containing La and particularly at least one of a $LaMnO_3$ oxide, a $LaFeO_3$ oxide, and a $LaCoO_3$ oxide in which Sr and La are present together in the A site is preferable and a $LaCoO_3$ oxide is particularly preferable in terms of the fact that the electrical conductivity at an operating temperature of about 600 to 1000° C. is high. In the perovskite oxides described above, Fe and Mn may be present with Co in the B site.

Moreover, the oxygen electrode layer 6 is required to have gas permeability. Therefore, conductive ceramics (perovskite oxide) forming the oxygen electrode layer 6 has an open porosity of 20% or more and particularly preferably in the range of 30 to 50%. The thickness of the oxygen electrode layer 6 is preferably 30 to 100 μm in terms of current collecting properties.

The interconnector layer 8 is formed with conductive ceramics. Since the interconnector layer 8 contacts the fuel gas (hydrogen containing gas) and oxygen containing gas, the interconnector layer 8 is required to have reduction resistance and oxidation resistance. Therefore, as the conductive ceramics having reduction resistance and oxidation resistance, a lantern chromite perovskite oxide ($LaCrO_3$ oxide) is used, for example, and a $LaCrMgO_3$ oxide in which Mg is present in the B site is used for the purpose of approximating the thermal expansion coefficient of the interconnector 8 to those of the conductive support member 1 and the solid electrolyte layer 4. The material of the interconnector layer 8 may be conductive ceramics and is not particularly limited.

The thickness of the interconnector layer 8 is preferably 10 to 60 μm in terms of prevention of gas leakage and electrical resistance. When the thickness is in this range, the gas leakage can be prevented and the electrical resistance can be lowered.

Furthermore, between the conductive support member 1 and the interconnector layer 8, an adhesion layer (not illustrated) for, for example, reducing a thermal expansion coefficient difference between the interconnector layer 8 and the conductive support member 1 can be formed.

As such an adhesion layer, a similar composition to that of the fuel electrode layer 3 can be employed. For example, the adhesion layer can be formed from at least one of rare earth oxides, $ZrO_2$ in which a rare earth element forms solid-solution, and $CeO_2$ in which a rare earth element forms solid-solution and Ni and/or NiO. More specifically, the adhesion layer can be formed from a composition containing $Y_2O_3$ and Ni and/or NiO, a composition containing $ZrO_2$ (YSZ) in which Y forms solid-solution and Ni and/or NiO, and a composition containing $CeO_2$ in which Y, Sm, Gd, and the like form solid-solution and Ni and/or NiO. The volume ratio of the rare earth oxide or $ZrO_2$ ($CeO_2$) in which a rare earth element forms solid-solution and Ni and/or NiO is preferably set in the range of 40:60 to 60:40.

The intermediate layer 9 preferably has a composition which contains a $CeO_2$ sintered compact containing a rare earth element other than Ce and which is represented by $(CeO_2)_{1-x}(REO_{1.5})_x$ (in the formula, RE is at least one of Sm, Y, Yb, and Gd and x satisfies $0<x\leq0.3$), for example. Furthermore, Sm and Gd are preferably used as RE in terms of reducing electrical resistance and the intermediate layer 9 preferably contains, for example, $CeO_2$ in which 10 to 20% by mol of $SmO_{1.5}$ or $GdO_{1.5}$ forms solid-solution.

An example of a method for manufacturing the fuel cell 10 of this embodiment described above is described.

First, for example, Ni and/or NiO powder, powder of rare earth oxide, such as $Y_2O_3$, an organic binder, and a solvent are mixed to prepare a molding body, a conductive support powder compact is produced using the molding body by extrusion molding, and then the conductive support powder compact is dried. As the conductive support powder compact, a calcinated body obtained by calcinating the conductive support powder compact at 900 to 1000° C. for 2 to 6 hours may be used.

Next, raw materials of NiO and $ZrO_2$ (YSZ) in which $Y_2O_3$ forms solid-solution are weighed out in accordance with a predetermined preparation composition, and then mixed, for example. Thereafter, an organic binder and a solvent are mixed with the mixed powder to prepare a slurry for fuel electrode layer.

Then, one obtained by adding toluene, binder powder (described later, higher molecular weight than the molecular weight of the binder powder which is made to adhere to $ZrO_2$ powder, e.g., acrylic resin), a commercially-available dispersing agent, and the like to $ZrO_2$ powder in which a rare earth element forms solid-solution to form a slurry is molded by a method, such as a doctor blade, to produce a sheet-like solid electrolyte layer powder compact.

In this case, in order to produce small pores, binder powder (polymer having good pyrolytic properties and having low molecular weight, e.g., acrylic resin: a so-called pore producing material) is added to $ZrO_2$ powder in which a rare earth element forms solid-solution, the $ZrO_2$ powder is coated with the binder powder by a wet method and dried, and then the resultant substance is heat-treated at a temperature equal to or lower than the thermal decomposition temperature of the binder powder to make the binder powder adhere to the $ZrO_2$ powder. The size of the pores can be controlled by the size of the binder powder which is made to adhere to the $ZrO_2$ powder. The porosity can be controlled by the addition amount of the binder powder which is made to adhere to the $ZrO_2$ powder. When the binder powder which is made to adhere to the $ZrO_2$ powder is large, large pores are formed. When the amount of the binder powder which is made to adhere to the $ZrO_2$ powder is large, the amount of the pores becomes large. Thus, an organization in which the pores do not communicate with each other and closed pores are dispersed can be obtained, so that even when the porosity is increased, gas leakage can be prevented.

Using such $ZrO_2$ powder to which such a binder powder is made to adhere, the slurry as described above is produced, and then a solid electrolyte layer powder compact is produced.

The slurry for fuel electrode layer is applied onto the obtained sheet-like solid electrolyte layer powder compact, and then dried to form a fuel electrode layer powder compact, and then a sheet-like laminated powder compact is formed. The surface on the side of the fuel electrode layer powder compact of the sheet-like laminated in which the fuel electrode layer powder compact and the solid electrolyte layer powder compact powder compact are laminated is laminated on the powder compact to form a powder compact.

Then, an interconnector layer material (for example, $LaCrMgO_3$ oxide powder), an organic binder, and a solvent are mixed to produce a slurry. In the following process, a method for manufacturing a fuel cell having an adhesion layer is described.

Then, an adhesion layer powder compact positioned between the conductive support member 1 and the interconnector layer 8 is formed. For example, $ZrO_2$ in which Y forms solid-solution and NiO are mixed in such a manner that the volume ratio is in the range of 40:60 to 60:40, the mixture is dried, an organic binder and the like are added to adjust a slurry for adhesion layer, and then the slurry for adhesion layer is applied onto the conductive support powder compact between both end portions of the solid electrolyte layer powder compact to form an adhesion layer powder compact.

Then, an intermediate layer to be disposed between the solid electrolyte layer 4 and the oxygen electrode layer 6 is formed. For example, $CeO_2$ powder in which $GdO_{1.5}$ forms solid-solution is heat-treated at 800 to 900° C. for 2 to 6 hours to adjust a raw material powder for intermediate layer powder compact. Toluene is added as a solvent to the raw material powder to produce a slurry for intermediate layer, and then the slurry is applied onto the solid electrolyte layer to produce an intermediate layer powder compact.

A sheet-like intermediate layer may be produced, and then the may be laminated on the solid electrolyte layer powder compact. Furthermore, a may be formed by applying the slurry for intermediate layer to the side on which the fuel electrode layer is not formed of the sheet-like solid electrolyte layer powder compact, drying the same, producing a sheet-like laminated in which the fuel electrode layer is formed on one side of the sheet-like solid electrolyte layer and the intermediate layer is formed on the other side thereof, and then laminating the surface on the side of the fuel electrode layer powder compact on the conductive support member powder compact.

Thereafter, the slurry for interconnector layer is applied to the upper surface of the adhesion layer powder compact in such a manner that both ends of the powder compact for interconnector layer are laminated on both ends of the solid electrolyte powder compact to produce a laminated powder compact. A laminated powder compact can also be produced by preparing the slurry for interconnector layer, producing a sheet for interconnector layer, and then laminating the sheet for interconnector layer on the upper surface of the adhesion layer powder compact in such a manner that both ends of the sheet for interconnector layer are laminated on both ends of the solid electrolyte powder compact.

Subsequently, the laminated powder compact above is subjected to binder removal treatment, and then simultaneously sintered (simultaneous firing) at 1400 to 1450° C. in an oxygen containing atmosphere for 2 to 6 hours.

Furthermore, a slurry containing an oxygen electrode layer material (for example, $LaCoO_3$ oxide powder), a solvent, and a pore increasing agent is applied onto an intermediate layer by dipping or the like, and then baked at 1000 to 1300° C. for 2 to 6 hours, whereby the fuel cell 10 of this embodiment of the structure illustrated in FIG. 1 can be manufactured. The fuel cell 10 is preferably subjected to reduction treatment of the conductive support member 1 and the fuel electrode layer 3 by injecting hydrogen gas thereinto after manufacturing the fuel cell 10. In that case, the reduction treatment is preferably performed at 750 to 1000° C. for 5 to 20 hours, for example.

Figure 3:
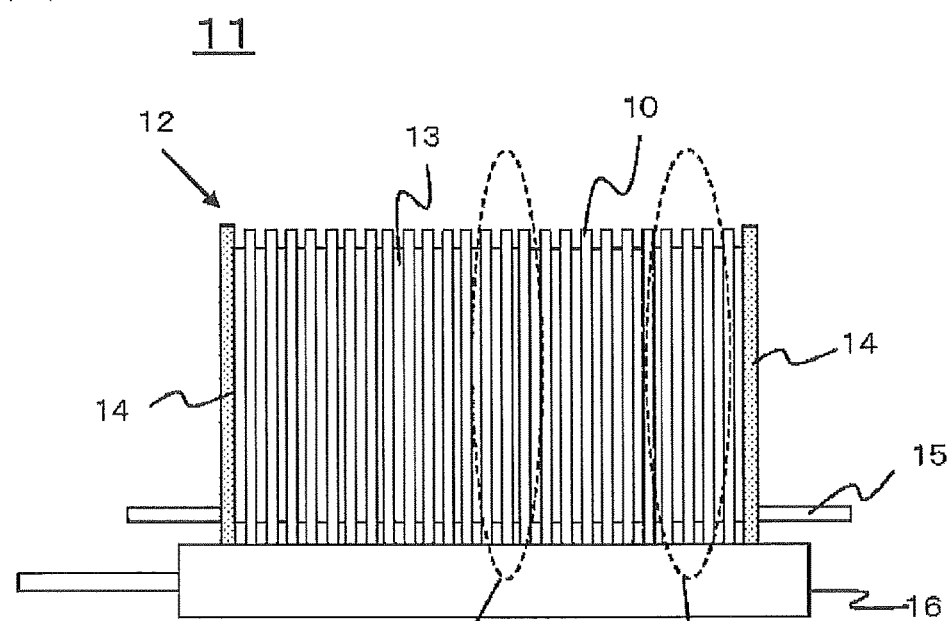
Figure 3:
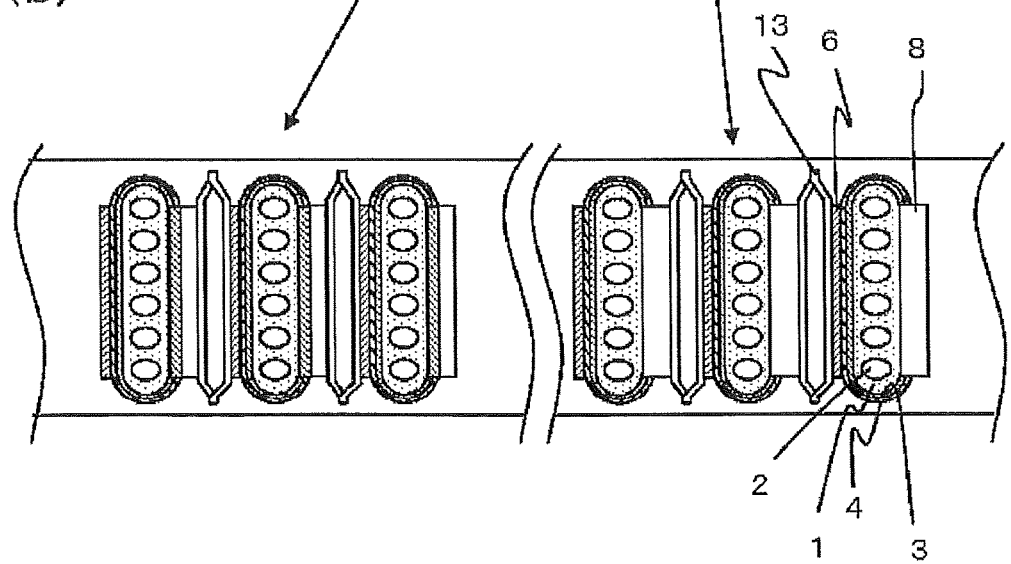

FIG. 3 illustrate an example of a cell stack device constituted by electrically connecting two or more of the fuel cells 10 described above in series through a current collecting member 13. FIG. 3(*a*) is a side view schematically illustrating a cell stack device 11 and FIG. 3(*b*) is a partially enlarged cross sectional view of the cell stack device 11 of FIG. 3(*a*) in which portions enclosed with the dashed lines illustrated in FIG. 3(*a*) are extracted and illustrated. In FIG. 3(*b*), the portions corresponding to the portions enclosed with the dashed lines illustrated in FIG. 3(*a*) are indicated by the arrows in order to clarify the portions. In the fuel cell 10 illustrated in FIG. 3(*b*), the illustration of some members described above, such as the intermediate layer 9, is omitted.

In the cell stack device 11, a cell stack 12 is constituted by arranging each fuel cells 10 with the current collecting member 13 therebetween and the lower end portion of each fuel cell 10 is fixed to a gas tank 16 for supplying fuel gas to the fuel cell 10 with an adhesive, such as a glass sealing material. The cell stack 12 is held from both ends in the arrangement direction of the fuel cells 10 by conductive members 14 which can be elastically deformed whose lower end portions are fixed to the gas tank 16.

The conductive members 14 illustrated in FIG. 3 are provided with a current extracting portion 15 for extracting current generated by the power generation of the cell stack 12 (fuel cells 10) in a shape of extending towards the outside along the arrangement direction of the fuel cells 10.

Herein, by constituting the cell stack 12 using the fuel cells 10 described above in the cell stack device 11 of this embodiment, the cell stack device 11 with improved reliability over a long period of time can be achieved.

Figure 4:
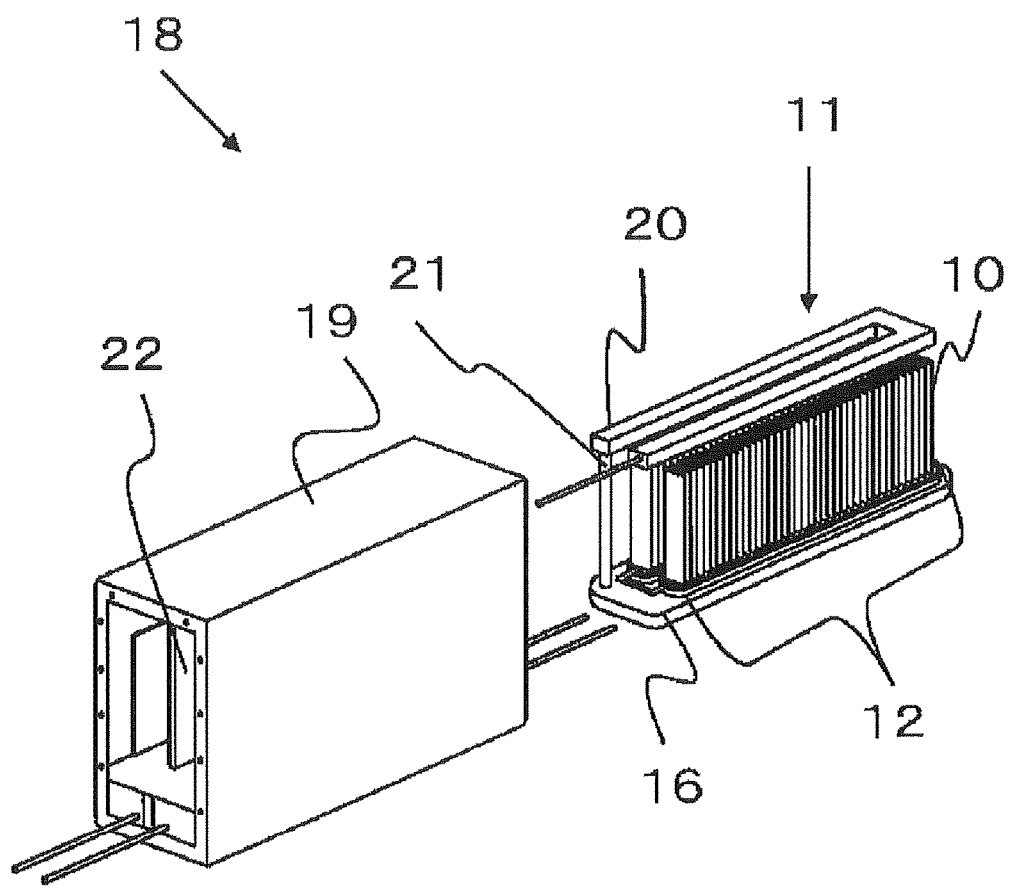
FIG. 4 is a perspective view of the appearance illustrating an example of a fuel cell module.

FIG. 4 is a perspective view of the appearance illustrating an example of a fuel cell module 18 storing the cell stack device 11 in a storage container. The fuel cell module 18 is constituted by storing the cell stack device 11 illustrated in FIG. 3 inside a rectangular parallelepiped-like storage container 19.

In order to obtain the fuel gas to be used in the fuel cell 10, a reformer 20 for reforming the raw materials and fuels, such as natural gas or kerosene, to generate the fuel gas is disposed above the cell stack 12. Then, the fuel gas generated in the reformer 20 is supplied to the gas tank 16 through a gas circulation tube 21, and then supplied to the fuel gas passage 2 provided inside the fuel cell 10 through the gas tank 16.

FIG. 4 illustrates a state in which the storage container 19 is partially (front and back surfaces) removed, and the cell stack device 11 and the reformer 20 stored inside are taken out backward. In the fuel cell module 18 illustrated in FIG. 4, the cell stack device 11 can be allowed to slide into the storage container 19 to be stored therein. The cell stack device 11 may also be one containing the reformer 20.

An oxygen containing gas introduction member 22 provided in the storage container 19 is disposed between a pair of cell stacks 12 disposed side by side in the gas tank 16 in FIG. 4 and supplies oxygen containing gas to the lower end portion of the fuel cell 10 in such a manner that the oxygen containing gas flows through the side of the fuel cell 10 to the upper end portion from the lower end portion in accordance with the flow of the fuel gas. Then, by allowing the fuel gas to be discharged from the fuel gas passage 2 of the fuel cell 10 to react with the oxygen containing gas to burn the same on the upper end side of the fuel cell 10, the temperature of the fuel cell 10 can be increased, so that the starting of the cell stack device 11 can be accelerated. Moreover, by burning the fuel gas to be discharged from the gas passage 2 of the fuel cell 10 and the oxygen containing gas on the upper end side of the fuel cell 10, the reformer 20 disposed above the fuel cell 10 (cell stack 12) can be warmed. Thus, the reformer 20 can efficiently perform a reforming reaction.

Furthermore, since the fuel cell module 18 of this embodiment is constituted by storing the cell stack device 11 using the fuel cell described above in the storage container 19, the fuel cell module 18 with improved reliability over a long period of time can be achieved.

Figure 5:
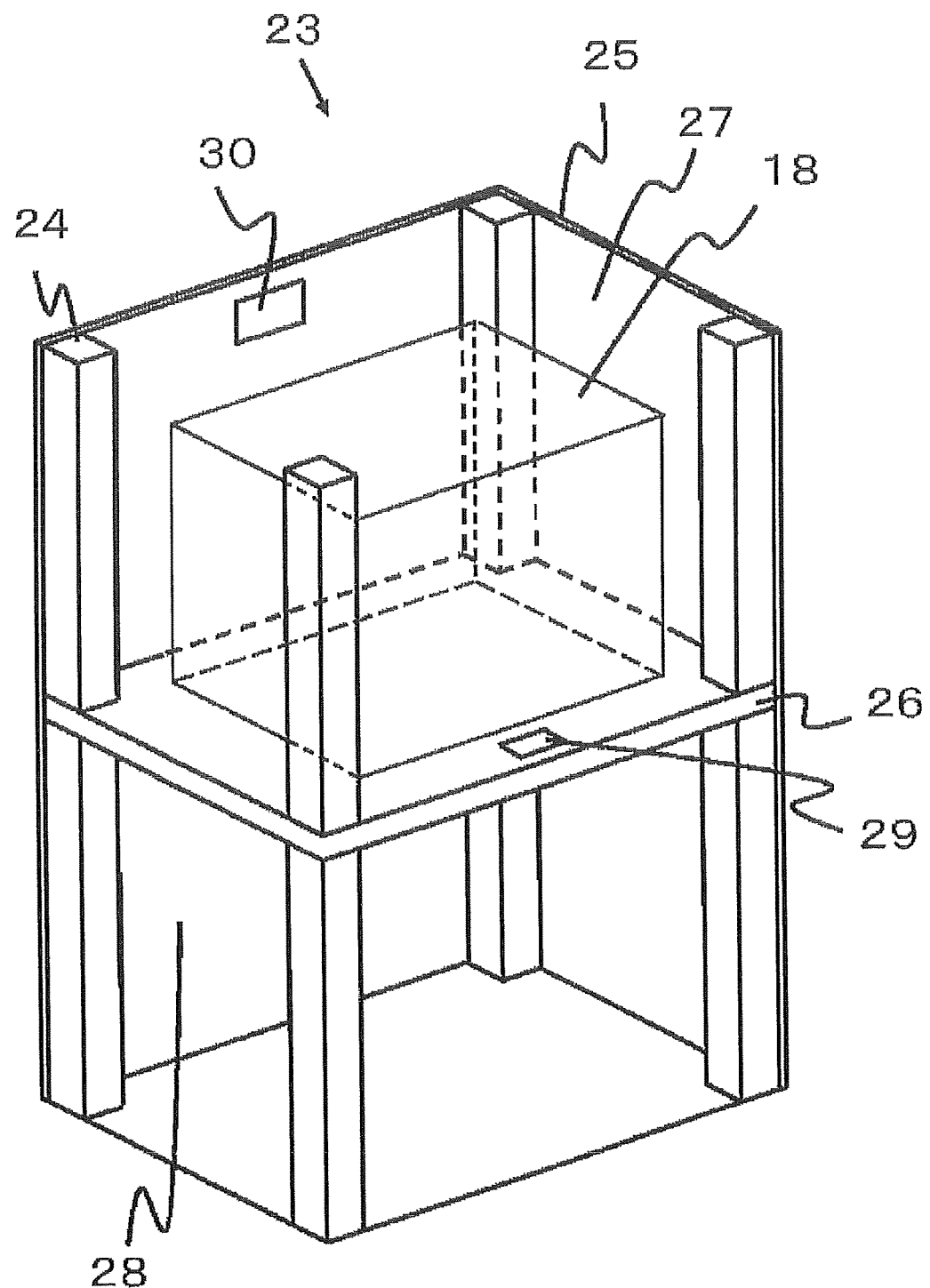
FIG. 5 is a perspective view illustrating a fuel cell device while partially omitting the same.

FIG. 5 is a perspective view illustrating an example of a fuel cell device storing the fuel cell module 18 illustrated in FIG. 4 and auxiliary devices for operating the cell stack device 11 in an outer case. In FIG. 5, the illustration of the configuration is partially omitted.

The fuel cell device 23 illustrated in FIG. 5 is configured so that the inside of the outer case containing supports 24 and an outer casing plate 25 is vertically divided with a dividing plate 26. The upper side is used as a module storage chamber 27 for storing the above-described fuel cell module 18. The lower side is used as an auxiliary device storage chamber 28 for storing auxiliary devices for operating the fuel cell module 18. The illustration of the auxiliary devices stored in the auxiliary device storage chamber 28 is omitted.

Moreover, the dividing plate 26 is provided with an air circulation port 29 for passing the air of the auxiliary device storage chamber 28 to the side of the module storage chamber 27. The outer casing plate 25 constituting the module storage chamber 27 is provided at one part thereof with a discharge port 30 for discharging the air in the module storage chamber 27.

Due to the fact that such a fuel cell device 23 is constituted by storing the fuel cell module 18 which can improve the reliability in the module storage chamber 27 as described above, the fuel cell device 23 with improved reliability can be achieved.

As described above, the present invention is not limited to the above-described embodiment and can be variously altered, improved, and the like without departing from the gist of the present invention. For example, a fuel cell in which an oxygen electrode layer, a solid electrolyte layer, and a fuel electrode layer are disposed on a conductive support member may be acceptable. Furthermore, for example, although the fuel electrode layer 3, the solid electrolyte layer 4, and the oxygen electrode layer 6 are laminated on the conductive support member 1 in the above-described embodiment, the fuel electrode layer 3 and the oxygen electrode layer 6 may be provided on both sides of the solid electrolyte layer 4 and the conductive support member is not necessarily required.

The above-described embodiment describes the hollow flat plate type solid oxide fuel cell but it is a matter of course that both a cylindrical solid oxide fuel cell and a flat plate-like solid oxide fuel cell may be acceptable. Moreover, various intermediate layers may be formed between each member in accordance with the function.

In this embodiment, one heaving pores can be used as the interconnector 8 having gas blocking properties. Also with respect to the interconnector 8, the thickness is preferably thinner because the electrical conductivity can be increased. However, since high stress is likely to be generated, the interconnector 8 preferably has pores in order to reduce the stress.

More specifically, the thickness of the interconnector 8 is 60 μm or less, the porosity in an arbitrary cross section of the interconnector 8 is 1 to 5% by area, and the average pore diameter of the pores in the interconnector 8 is 2 μm or less. The thickness of the interconnector 8 is desirably 50 μm or less and the porosity is desirably 1 to 3.2% by area.

In such a fuel cell, the fuel gas to be supplied to the fuel electrode layer 3 and the oxygen containing gas to be supplied to the oxygen electrode layer 6 can be blocked by the interconnector 8. Thus, a cylindrical body having gas blocking properties can be formed by the solid electrolyte layer 4 and interconnector 8. Moreover, since the porosity of the interconnector 8 is as high as 1 to 5% by area, the rigidity of the interconnector 8 decreases, so that stress generated in the interconnector 8 can be reduced.

Example 1

First, NiO powder with an average particle diameter of 0.5 μm and $Y_2O_3$ powder with an average particle diameter of 0.9 μm were mixed, and then a molding body produced with an organic binder and a solvent was molded by an extrusion molding method, and then the resultant substance was dried and degreased to produce a conductive support member powder compact. The volume ratio after firing-reduction of the conductive support member powder compact, NiO was 48% by volume and $Y_2O_3$ was 52% by volume.

Next, binder powder (low molecular weight) containing acrylic resin was added to $ZrO_2$ powder (solid electrolyte layer raw material powder) in which 8 mol % Y formed solid-solution having a particle diameter by a Microtrack method of 0.8 μm, and then the $ZrO_2$ powder was coated with the binder powder by a wet method, and then the resultant substance was dried and heat-treated at 300° C. The size of pores was controlled by the size of the binder powder which was made to adhere to the $ZrO_2$ powder and the porosity was controlled by the amount of the binder powder which was made to adhere to the $ZrO_2$ powder. Table 1 shows the amount of the binder powder based on 100% by mass of the $ZrO_2$ powder and shows the average particle diameter of the binder powder.

A sheet for solid electrolyte layer was produced by a doctor blade method using a slurry obtained by mixing the solid electrolyte layer raw material powder to which the binder powder was made to adhere, binder powder (high molecular weight) containing acrylic resin, and a solvent.

A slurry for forming an intermediate layer powder compact was produced by crushing a composite oxide containing 90% by mol of $CeO_2$ and 10% by mol of oxide of a rare earth element ($GdO_{1.5}$, $SmO_{1.5}$) in a vibration mill or a ball mill using isopropyl alcohol (IPA) as a solvent, calcinating the same at 900° C. for 4 hours, disintegrating the resultant substance again in a ball mill to adjust the aggregation degree of ceramic particles, and then adding an acrylic binder and toluene to the powder, followed by mixing.

Next, a slurry for fuel electrode layer in which NiO powder with an average particle diameter of 0.5 µm, $ZrO_2$ powder in which $Y_2O_3$ formed solid-solution, an organic binder, and a solvent were mixed was produced, applied onto the sheet for solid electrolyte layer by a screen printing method, and then dried to form a fuel electrode layer powder compact. Then, a slurry for forming an intermediate layer was applied onto the sheet for solid electrolyte layer on the surface opposite to the surface on which the fuel electrode layer powder compact was formed by a screen printing method, and then dried to form an intermediate layer powder compact.

A sheet-like laminated powder compact in which the intermediate layer powder compact and the fuel electrode layer powder compact were formed on both sides of the sheet for solid electrolyte layer was laminated on a predetermined position of the conductive support member powder compact with the surface on the side of the fuel electrode layer powder compact as the inside.

Then, the laminated powder compact on which the powder compacts were laminated described above was calcinated at 1000° C. for 3 hours.

Then, a slurry in which $La(Mg_{0.3}Cr_{0.7})_{0.96}O_3$ with an average particle diameter of 0.7 µm, an organic binder, and a solvent were mixed was produced.

Raw materials containing Ni and YSZ were mixed, dried, and then mixed with an organic binder and a solvent to adjust a slurry for adhesion layer. The adjusted slurry for adhesion layer was applied to a portion (portion where the conductive support member was exposed) where the fuel electrode layer (and solid electrolyte layer) was not formed of the conductive support member to laminate an adhesion layer powder compact thereon, and then a slurry for interconnector layer was applied onto the adhesion layer powder compact.

Subsequently, the laminated powder compact described above was subjected to binder removal treatment, and subjected to simultaneous firing at 1450° C. in an oxygen containing atmosphere for 2 hours.

Next, a mixed liquid containing $La_{0.6}Sr_{0.4}Co_{0.2}Fe_{0.8}O_3$ powder with an average particle diameter of 2 µm and isopropyl alcohol was produced, and then applied by spraying to the surface of an intermediate layer of a laminated sintered compact to form an oxygen electrode layer powder compact. Then, the oxygen electrode layer powder compact was baked at 1100° C. in 4 hours to form an oxygen electrode layer, whereby the fuel cell illustrated in FIG. 1 was produced.

Next, hydrogen gas was injected into the fuel cell to perform reduction treatment of the conductive support member and the fuel electrode layer at 850° C. for 10 hours.

The size of the produced fuel cell was 25 mm×200 mm, the thickness (thickness between the flat surfaces n) was 2 mm and the open porosity was 35% in the conductive support member, the thickness was 10 µm and the open porosity was 24% in the fuel electrode layer, the thickness was 50 µm and the open porosity was 40% in the oxygen electrode layer, and the thickness of the interconnector layer was 40 µm. The formation area of the solid electrolyte layer on the conductive support member was 5800 $mm^2$. The thickness, the porosity, the average pore diameter, and the residual stress of the solid electrolyte layer were shown in Table 1.

With respect to the thickness of the solid electrolyte layer, the thickness of the solid electrolyte layer 4 on the arc-like surfaces of the conductive support member was determined from a photograph of a scanning electron microscope (SEM). With respect to the porosity of the solid electrolyte layer, ten SEM photographs (×10000) of an arbitrary cross section were determined for the pore area with an image analyzer, the average value was calculated, and then the ratio of the pore area to the entire solid electrolyte layer area was determined to be defined as the porosity of the solid electrolyte layer. Moreover, the average pore diameter was determined from the pore area and the number of pores. The arc-like surfaces of the fuel cell were irradiated with X-rays, and then the residual stress of the solid electrolyte layer on the arc-like surfaces was determined by X ray diffraction.

The gas blocking properties by the solid electrolyte layer were confirmed by a leak test. The leak test is a test including putting the fuel cell in which the fuel gas passage on one side is sealed by a predetermined member in water, and then supplying He gas pressurized to 3 kg/$cm^2$ from the fuel gas passage on the other side of the fuel cell for 60 seconds. One in which air bubbles were generated from the solid electrolyte layer of the fuel cell was judged to have no gas blocking properties and one in which air bubbles were not generated from the solid electrolyte layer of the fuel cell was judged to have gas blocking properties. The results were shown Table 1. Moreover, as the power generation performance, the power density (0.3 A/$cm^2$, 750° C.) of the cell was measured. The results were shown Table 1.

TABLE 1

| Sample No. | Binder addition amount (% by mass) | Binder average particle diameter (µm) | Solid electrolyte layer | | | | Gas blocking properties | Power generation performance |
| | | | Porosity (% by area) | Average pore diameter (µm) | Thickness (µm) | Residual stress (MPa) | | Power density W/$cm^2$ |
| --- | --- | --- | --- | --- | --- | --- | --- | --- |
| 1-1 | 1.8 | 1.0 | 5 | 0.8 | 30 | −420 | ○ | 0.245 |
| 1-2 | 3.0 | 1.0 | 8 | 0.8 | 30 | −396 | ○ | 0.243 |
| 1-3 | 3.5 | 1.0 | 10 | 0.8 | 30 | −380 | ○ | 0.243 |
| 1-4 | 4.2 | 1.0 | 12 | 0.8 | 30 | −366 | ○ | 0.238 |
| 1-5 | 5.0 | 1.0 | 15 | 0.8 | 30 | −354 | ○ | 0.239 |
| 1-6 | 7.2 | 1.0 | 20 | 0.8 | 30 | −350 | x | 0.201 |
| 1-7 | 4.2 | 0.6 | 12 | 0.5 | 20 | −385 | ○ | 0.253 |
| 1-8 | 4.2 | 1.2 | 12 | 1.1 | 20 | −370 | ○ | 0.250 |
| 1-9 | 4.2 | 1.5 | 12 | 1.5 | 40 | −367 | ○ | 0.231 |
| 1-10 | 4.3 | 2.4 | 12 | 2 | 40 | −340 | ○ | 0.231 |
| 1-11 | 4.3 | 3.0 | 12 | 2.5 | 30 | −304 | x | 0.211 |

From the results of Table 1, it is found that, in the case where the thickness of the solid electrolyte layer is 20 to 40 μm, the fuel gas supplied to the fuel electrode layer and the oxygen containing gas supplied to the oxygen electrode layer can be blocked by the solid electrolyte layer in the samples No. 1-1 to 1-5 and 1-7 to 1-10 in which even when the porosity in the solid electrolyte layer is 5 to 15% by area, the average pore diameter of the pores in the solid electrolyte layer is 2 μm or less and when the average pore diameter is larger and the average pore diameter is larger, the residual stress of the solid electrolyte layer is smaller.

On the other hand, it is found that the sample No. 1-6 in which the porosity is as high as 20% by area has no gas blocking properties and the sample No. 1-11 in which the average pore diameter is as large as 2.5 μm also has no gas blocking properties and both the samples have low power generation performance.

Example 2

With respect to the case where the thickness of the solid electrolyte layer is 15 μm or less, the same experiment as that of Example 1 was performed. More specifically, binder powder (low molecular weight) containing acrylic resin was added to $ZrO_2$ powder (solid electrolyte layer raw material powder) in which 8 mol % Y formed solid-solution having a particle diameter by a Microtrack method of 0.8 μm, and then the $ZrO_2$ powder was coated with the binder powder by a wet method, and then the resultant substance was dried and heat-treated at 300° C. The size of pores was controlled by the size of the binder powder and the porosity was controlled by the amount of the binder powder. Table 2 shows the amount of the binder powder based on 100% by mass of the $ZrO_2$ powder and shows the average particle diameter of the binder powder.

A sheet for solid electrolyte layer was produced by a doctor blade method using a slurry obtained by mixing the solid electrolyte layer raw material powder, binder powder (high molecular weight) containing acrylic resin, and a solvent. A fuel cell illustrated in FIG. 1 was produced and evaluated in the same manner as in Example 1 described above. The results are shown in Table 2.

samples have pores in the solid electrolyte layer, the residual stress of the solid electrolyte layer can be reduced.

Example 3

In the sample No. 4 of Example 1, an experiment of changing the porosity of the interconnector layer was performed.

First, binder powder (low molecular weight) containing acrylic resin was added to $La(Mg_{0.3}Cr_{0.7})_{0.96}O_3$ powder (interconnector layer raw material powder) having a particle diameter by a Microtrack method of 0.7 μm, and then the interconnector layer raw material powder was coated with the binder powder by a wet method, and then the resultant substance was dried and heat-treated at 300° C. The size of pores was controlled by the size of the binder powder and the porosity was controlled by the amount of the binder powder. Table 3 shows the amount of the binder powder based on 100% by mass of the interconnector layer raw material powder and shows the average particle diameter of the binder powder.

A slurry was produced by mixing the interconnector layer raw material powder, binder powder (high molecular weight) containing acrylic resin, and a solvent.

Using the slurry, a fuel cell illustrated in FIG. 1 was produced in the same manner as in Example 1. Thereafter, hydrogen gas was injected into the fuel cell to perform reduction treatment of the conductive support member and the fuel electrode layer at 850° C. for 10 hours.

The size of the produced fuel cell was 25 mm×200 mm, the thickness (thickness between the flat surfaces n) was 2 mm and the open porosity was 35% in the conductive support member, the thickness was 10 μm and the open porosity was 24% in the fuel electrode layer, and the thickness was 50 μm and the open porosity was 40% in the oxygen electrode layer. The thickness and the like of the solid electrolyte layer are as shown in the sample No. 1-4 of Table 1. The thickness, the porosity, and the average pore diameter of the interconnector layer were shown in Table 3.

With respect to the thickness of the interconnector layer, the thickness of the interconnector layer in the flat portion of the conductive support member was determined from a

TABLE 2

| Sample No. | Binder addition amount (% by mass) | Binder average particle diameter (μm) | Solid electrolyte layer | | | Gas blocking properties | Power generation performance Power density W/cm² |
|---|---|---|---|---|---|---|---|
| | | | Porosity (% by area) | Average pore diameter (μm) | Thickness (μm) | | |
| 2-1 | 1.5 | 0.6 | 3 | 0.5 | 5 | ○ | 0.254 |
| 2-2 | 1.5 | 0.6 | 3 | 0.5 | 10 | ○ | 0.252 |
| 2-3 | 1.5 | 0.6 | 3 | 0.5 | 15 | ○ | 0.251 |
| 2-4 | 1.8 | 0.6 | 5 | 0.5 | 10 | ○ | 0.253 |
| 2-5 | 3 | 1 | 8 | 0.8 | 10 | ○ | 0.252 |

From Table 2, it is found that, in the case where the thickness of the solid electrolyte layer is 5 to 15 μm, the fuel gas supplied to the fuel electrode layer and the oxygen containing gas supplied to the oxygen electrode layer can be blocked by the solid electrolyte layer in the samples No. 2-1 to 2-5 in which the porosity in the solid electrolyte layer is 3 to 8% by area and the average pore diameter of the pores in the solid electrolyte layer is 0.5 to 0.8 μm and since the photograph of a scanning electron microscope (SEM) and the porosity and the average pore diameter of the interconnector layer were determined in the same manner as in Example 1.

The gas blocking properties by the interconnector layer were determined in the same manner as Example 1, and the results were shown Table 3. Moreover, as the power generation performance, the power density (0.3 A/cm², 750° C.) of the cell was measured. The results were shown Table 3.

TABLE 3

| | Binder | Binder | Interconnector layer | | | | Power generation performance |
|---|---|---|---|---|---|---|---|
| Sample No. | addition amount (% by mass) | average particle diameter (μm) | Porosity (% by area) | Average pore diameter (μm) | Thickness (μm) | Gas blocking properties | Power density W/cm² |
| 3-1 | 1.5 | 1.0 | 1.2 | 0.8 | 35 | ○ | 0.250 |
| 3-2 | 3.0 | 1.0 | 1.5 | 0.8 | 40 | ○ | 0.245 |
| 3-3 | 3.0 | 1.5 | 2.0 | 1.2 | 40 | ○ | 0.243 |
| 3-4 | 3.5 | 1.0 | 2.5 | 0.8 | 40 | ○ | 0.240 |
| 3-5 | 4.2 | 3.0 | 3.2 | 2.0 | 55 | ○ | 0.231 |

From Table 3, it is found that, in the case where the thickness of the interconnector layer is 35 to 55 μm, the fuel gas supplied to the fuel electrode layer and the oxygen containing gas supplied to the oxygen electrode layer can be blocked by the solid electrolyte layer in samples No. 3-1 to 3-5 in which the porosity in the interconnector layer is 1.2 to 3.2% by area and the average pore diameter of the pores in the interconnector layer is 0.8 to 2 μm and since the samples have pores in the solid electrolyte layer, the residual stress of the solid electrolyte layer can be reduced.

REFERENCE SIGNS LIST

1: CONDUCTIVE SUPPORT MEMBER
2: FUEL GAS PASSAGE
3: FUEL ELECTRODE LAYER
4: SOLID ELECTROLYTE LAYER
6: OXYGEN ELECTRODE LAYER
8: INTERCONNECTOR LAYER
11: CELL STACK DEVICE
18: FUEL CELL MODULE
23: FUEL CELL DEVICE
B: PORE

The invention claimed is:

1. A solid oxide fuel cell, comprising:
a solid electrolyte layer that has gas blocking properties, the solid electrolyte layer comprising first and second main surfaces opposite to each other;
a fuel electrode layer on the first main surface; and
an oxygen electrode layer on the second main surface; wherein
the solid electrolyte layer is a single layer;
a thickness of the solid electrolyte layer is 40 μm or less;
a porosity of the solid electrolyte layer in an arbitrary cross section of the solid electrolyte layer is 3 to 15% by area; and
an average pore diameter of pores in the solid electrolyte layer is 2 μm or less.

2. The solid oxide fuel cell according to claim 1, wherein the thickness of the solid electrolyte layer is 20 to 40 μm and the porosity of the solid electrolyte layer is 8 to 15% by area.

3. The solid oxide fuel cell according to claim 1, wherein the thickness of the solid electrolyte layer is 5 to 15 μm and the porosity of the solid electrolyte layer is 3 to 8% by area.

4. The solid oxide fuel cell according to claim 1, further comprising an interconnector electrically connected to the fuel electrode layer and having a thickness of 60 μm or less, wherein
the interconnector and the solid electrolyte layer form an elliptic or circular cylindrical fuel gas passage;
a porosity in an arbitrary cross section of the interconnector is 1 to 5% by area; and
an average pore diameter of pores in the interconnector is 2 μm or less.

5. The solid oxide fuel cell according to claim 1, further comprising a conductive support member, wherein
the fuel electrode layer is disposed on the conductive support member; and
the solid electrolyte layer is disposed on the conductive support member and covers the fuel electrode layer.

6. The solid oxide fuel cell according to claim 1, wherein an area of the first main surface of the solid electrolyte layer is 1900 mm² or more.

7. A cell stack device, comprising a plurality of the solid oxide fuel cells according to claim 1, wherein the plurality of the solid oxide fuel cells are electrically connected.

8. A fuel cell module, comprising:
a container; and
a plurality of the solid oxide fuel cells according to claim 1 in the container.

9. A fuel cell device, comprising:
an outer case;
the fuel cell module according to claim 8 in the outer case; and
an auxiliary device for operating the fuel cell module in the outer case.

* * * * *